No. 768,915. PATENTED AUG. 30, 1904.
F. B. STONER & C. HOTALING.
DRILL ROD CLUTCH.
APPLICATION FILED OCT. 28, 1903.
NO MODEL.
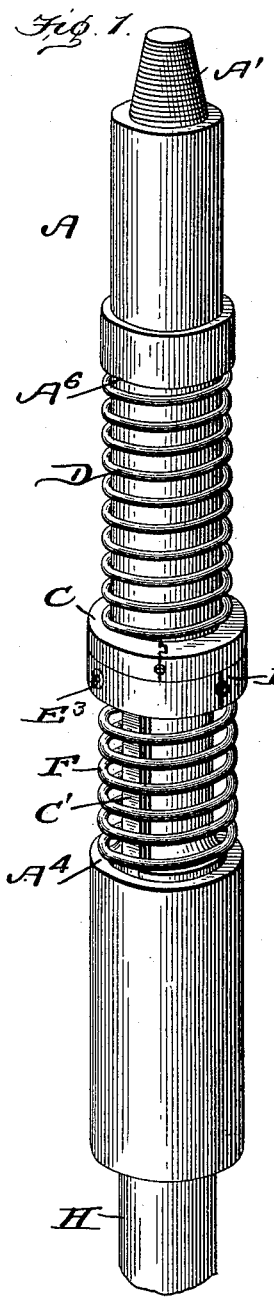
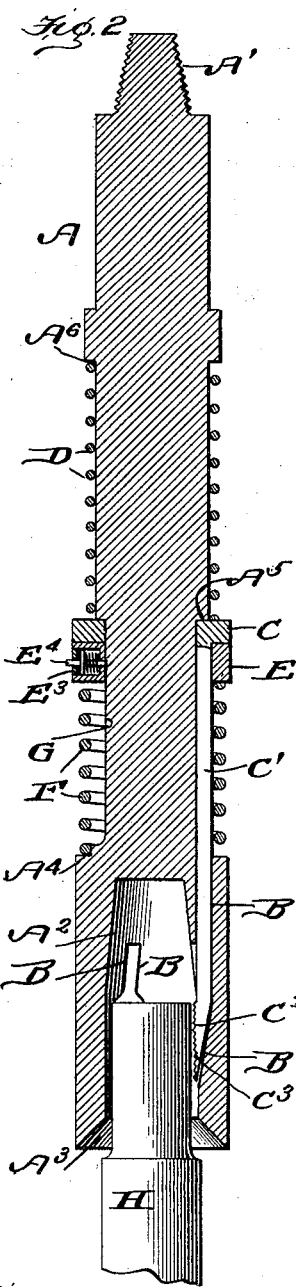
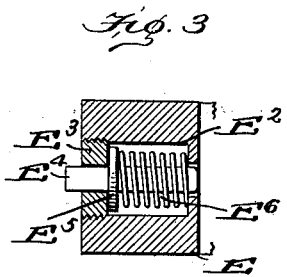
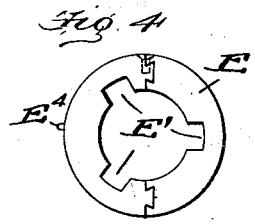
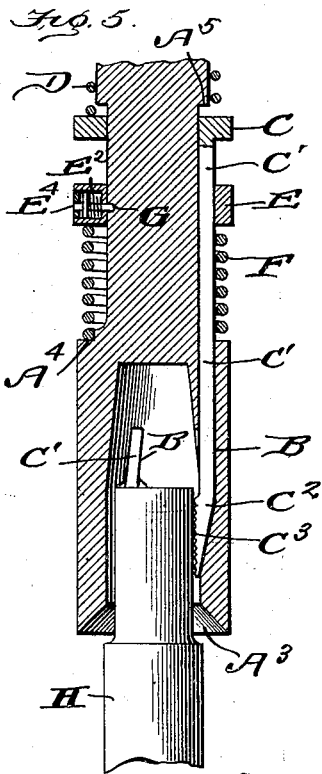
Witnesses
M. S. Blondel,
Clarence Shaw.
Inventors
F. B. Stoner,
C. Hotaling.
By Meredith Brock
Attorneys No. 768,915.

Patented August 30, 1904.

UNITED STATES PATENT OFFICE.

FREDERICK B. STONER AND CALVIN HOTALING, OF CHANUTE, KANSAS.

DRILL-ROD CLUTCH.

SPECIFICATION forming part of Letters Patent No. 768,915, dated August 30, 1904.

Application filed October 28, 1903. Serial No. 178,931. (No model.)

*To all whom it may concern:*

Be it known that we, FREDERICK B. STONER and CALVIN HOTALING, citizens of the United States, residing at Chanute, in the county of Neosho and the State of Kansas, have invented a new and useful Improvement in Drill-Rod Clutches, of which the following is a specification.

This invention relates to a socket-and-clutch mechanism intended for use in fishing lost drill-tools out of a well. A disadvantage of the usual tool intended for this purpose is that if successful in fishing for and gripping the drill and it is then unable to pull it out there is no means provided for releasing it from the drill gripped, and the fishing-tool can only be withdrawn through the breaking of some of its parts.

The object of our invention is to provide a clutch which will grip the tool fished for and to provide means whereby the clutch can be made to release its hold if the tool clutched cannot be withdrawn by the fishing-tool.

Our invention consists of the novel features of construction and combination of parts hereinafter described, particularly pointed out in the claims, and shown in the accompanying drawings, in which—

Figure 1 is a perspective view of our device and a portion of a drill gripped by it. Fig. 2 is a longitudinal section through our device, the drill fished for and the clutches being shown in elevation. Fig. 3 is a detail sectional view through the casing containing the locking-pin, the pin being shown in elevation. Fig. 4 is a plan view of the ring carrying the locking-pin. Fig. 5 is a longitudinal section through the lower portion of the device, showing the position of the parts when a drill-rod is gripped. Fig. 6 is a fragmentary view in elevation of the lower portion of one of the clutches.

In the drawings, A represents a cylindrical rod having a reduced conical threaded end $A'$, by means of which it can be connected to the rod by which the fishing-tool is lowered into the well. At its lower end the rod A is enlarged and has a socket $A^2$ formed therein, the lower outer end of said socket being flared, as shown at $A^3$. The enlargement of the lower portion of the rod produces an annular shoulder $A^4$, and adjacent the upper end of the rod a similar shoulder $A^5$ is formed. In the walls of the socket are arranged equidistant apart three vertical slots B. The socket $A^2$ tapers inward, and the lower portion of each slot is widened and inclined inwardly, as shown by the inwardly-sloping wall $B'$. Each of the slots B therefore opens downwardly into the socket $A^2$ and adjacent the lower end of the said socket and upwardly through and above the shoulder $A^4$. Arranged on and adapted to slide on the rod A between the two shoulders is a ring C, and this ring has connected to it downwardly-extending arms $C'$, which arms carry at their lower ends an enlarged longitudinally curved portion $C^2$, having a serrated inner face $C^3$, adapted to grip and bite into a drill. The arms extend upwardly through the slots B and slide vertically in said slot as the ring C slides on the rod A, though it will be understood that this movement is very slight. The curved clutch portion $C^2$ of each arm rests partially in the slot and partially in the socket, the rear smooth face of the clutch being beveled and resting against the inclined wall $B'$ of the slot. Three of these arms and clutches are provided, and it will be readily seen, therefore, that the drill will be practically inclosed by the clutches and gripped from every side. A shoulder $A^6$ is formed on the rod A above the shoulder $A^5$ and a coiled spring is arranged around the the rod, the lower portion of the spring bearing against the ring C and the upper portion against the shoulder $A^6$, and the tendency of this spring D is to force the ring downward, and consequently to force the clutches both downward and slightly inward.

Arranged on the rod below the ring C is a ring E, which ring is formed with notches $E'$, so that it will fit over the arms C and permit them to slide freely. A coiled spring F, heavier and stronger than the spring D, bears at its lower end on the shoulder $A^4$ and at its upper end upward on the ring E, forcing the said ring against the ring C and the latter against the shoulder $A^5$, drawing the clutches slightly upward and outward, the various parts being in the position shown in Fig. 2.

On one side the ring E is cut out, forming a small casing $E^2$, the front of which is closed by the perforated threaded plug $E^3$, and the inner end is perforated to aline with the perforation of the plug. A pin $E^4$ passes through and slides in these perforations. Within the casing the spring carries a washer $E^5$, and a weak coiled spring $E^6$ bears on the washer at one end and on the inner end of the casing at the opposite end. In the rod A is formed a notch G some little distance below the shoulder $A^5$, and this notch is adapted to be engaged by the pin $E^4$.

The manner of using our device is as follows: When a drill or other tool is to be fished for, the ring E is forced downward until the pin $E^4$ is in alinement with the notch G and the pin is pressed into engagement with said notch. The upward pressure of the spring F on the ring E will cause the pin to bind in the notch G, and it will be held in such engagement by friction. The ring C being relieved of the upward pressure of the ring E will be forced downward by the spring D and the clutches $C^2$ thrown into gripping position. Should it be found after gripping the tool fished for that it cannot be withdrawn, the rod is jarred and this jarring of the rod will cause the pin to lose its hold in the notch G, and the spring $E^6$ will force it outward, whereupon the spring F will force the ring E upward, and the spring F, being stronger than the spring D, the ring C will be also carried upward until it engages the shoulder $A^5$, which will lift the clutches and release the drill or tool, and the rod A can be withdrawn without danger of breaking it.

In the drawings, H represents a drill or other tool for which it may be necessary to fish.

The rings are originally formed in sections and dovetailed together, being held by suitable countersunk screws. This construction is shown in connection with the ring E. The rings are of course fastened after being placed in position.

Having thus fully described our invention, what we claim as new, and desire to secure by Letters Patent, is—

1. A device of the kind described comprising a rod having a socket at its lower end and slots leading downward into said socket, clutches arranged in the socket and having arms projecting upward through the slots, a ring adapted to slide on the rod and connected to the clutch-arms, a spring pressing downwardly on said ring, a second ring arranged below and in normal contact with the first-mentioned ring, a spring pressing upwardly on the second ring, and means for temporarily locking the said second ring out of contact with the ring first mentioned.

2. A device of the kind described comprising a rod having a shoulder formed thereon and a notch, a ring adapted to slide on said rod and bear against the shoulder, clutch members connected to the ring and adapted to be actuated by sliding movement of said ring, a spring adapted to press the ring away from the shoulder, a second ring notched to fit over the clutch members, a pin carried by said notched ring adapted to engage the notch and hold the second ring away from the first-mentioned ring, and a spring adapted to force the second-mentioned ring into engagement with the first ring and slide both rings when the pin is disengaged from the notch.

FREDERICK B. STONER.
CALVIN HOTALING.

Witnesses:
J. M. KILLIEN,
I. L. McGEE.